US007266832B2

(12) United States Patent  
Miller

(10) Patent No.: US 7,266,832 B2
(45) Date of Patent: Sep. 4, 2007

(54) ADVERTISEMENT SWAPPING USING AN AGGREGATOR FOR AN INTERACTIVE TELEVISION SYSTEM

(75) Inventor: Douglas Allyn Miller, Seattle, WA (US)

(73) Assignee: Digeo, Inc., Kirkland, WA (US)

( * ) Notice: Subject to any disclaimer, the term of this patent is extended or adjusted under 35 U.S.C. 154(b) by 831 days.

(21) Appl. No.: 09/883,098

(22) Filed: Jun. 14, 2001

(65) Prior Publication Data

US 2003/0046690 A1    Mar. 6, 2003

(51) Int. Cl.
H04N 7/10 (2006.01)
H04N 7/25 (2006.01)

(52) U.S. Cl. .......................... 725/34; 709/217; 725/112
(58) Field of Classification Search .................. 725/36, 725/34, 35, 112; 709/217
See application file for complete search history.

(56) References Cited

U.S. PATENT DOCUMENTS

| | | | |
|---|---|---|---|
| 4,303,937 A | 12/1981 | Cook | |
| 4,331,974 A | 5/1982 | Cogswell et al. | |
| 4,404,589 A | 9/1983 | Wright, Jr. | |
| 4,630,108 A | 12/1986 | Gomersall | |
| 4,706,121 A | 11/1987 | Young | |
| 4,814,883 A | 3/1989 | Perine et al. | 358/181 |
| 4,829,372 A | 5/1989 | McCalley et al. | 358/86 |
| 4,888,638 A | 12/1989 | Bohn | 358/84 |
| 4,974,085 A | 11/1990 | Campbell et al. | 358/181 |
| 5,029,014 A | 7/1991 | Lindstrom | 358/342 |
| 5,055,924 A | 10/1991 | Skutta | |
| 5,099,319 A | 3/1992 | Esch et al. | 358/86 |
| 5,155,591 A | 10/1992 | Wachob | |
| 5,233,423 A | 8/1993 | Jernigan et al. | 358/181 |
| 5,353,121 A | 10/1994 | Young et al. | |
| 5,446,919 A | 8/1995 | Wilkins | |
| 5,479,266 A | 12/1995 | Young et al. | |

(Continued)

FOREIGN PATENT DOCUMENTS

WO    WO99/55066    10/1999

OTHER PUBLICATIONS

Sanders, "TV Ads Will Soon Be Watching You," Seattle Times, Jun. 12, 2001.

(Continued)

Primary Examiner—Scott E. Beliveau
Assistant Examiner—James Sheleheda
(74) Attorney, Agent, or Firm—Darby & Darby P.C.; Bruce E. Black

(57) ABSTRACT

An aggregator is provided in connection with advertisement swapping. The aggregator can be implemented in an interactive television system so as to perform real-time aggregation of trigger information for advertisement swapping through cooperation with content providers or third-party entities. The aggregated information can then be made available to set top boxes and/or ancillary devices of subscribers. Advertisement swapping may be performed via use of the trigger information to perform channel switching to a channel that broadcasts substitute advertisements or via use of the trigger information to retrieve substitute advertisements from a storage unit. The advertisement swapping may be performed by devices of opted-in subscribers, or by devices at a broadcast center. The advertisement swapping can also include replacement of original links in the advertisements with substitute links, so that the viewer can experience interactivity and/or receive substitute interactive content associated with the substitute links.

31 Claims, 4 Drawing Sheets

U.S. PATENT DOCUMENTS

| | | | |
|---|---|---|---|
| 5,479,268 A | 12/1995 | Young et al. | |
| 5,532,754 A | 7/1996 | Young et al. | |
| 5,585,858 A | 12/1996 | Harper et al. | |
| 5,600,366 A | 2/1997 | Schulman | 348/9 |
| 5,661,516 A | 8/1997 | Carles | 348/8 |
| 5,715,018 A | 2/1998 | Fasciano et al. | 348/722 |
| 5,727,060 A | 3/1998 | Young | |
| 5,745,837 A | 4/1998 | Fuhrmann | |
| 5,774,170 A * | 6/1998 | Hite et al. | 725/34 |
| 5,774,664 A | 6/1998 | Hidary et al. | 395/200.48 |
| 5,774,666 A | 6/1998 | Portuesi | 395/200.48 |
| 5,790,806 A | 8/1998 | Koperda | |
| 5,809,204 A | 9/1998 | Young et al. | |
| 5,833,468 A | 11/1998 | Guy et al. | |
| 5,870,150 A | 2/1999 | Yuen | |
| 5,886,746 A | 3/1999 | Yuen et al. | |
| 5,892,536 A | 4/1999 | Logan et al. | |
| 5,929,850 A | 7/1999 | Broadwin et al. | |
| 5,940,073 A | 8/1999 | Klosterman et al. | |
| 5,970,206 A | 10/1999 | Yuen et al. | |
| 5,973,723 A | 10/1999 | DeLuca | |
| 5,974,222 A | 10/1999 | Yuen et al. | |
| 5,986,692 A | 11/1999 | Logan et al. | 348/13 |
| 5,995,092 A | 11/1999 | Yuen et al. | |
| 6,002,393 A | 12/1999 | Hite et al. | |
| 6,029,045 A | 2/2000 | Picco et al. | |
| 6,061,719 A * | 5/2000 | Bendinelli et al. | 709/218 |
| 6,064,420 A | 5/2000 | Harrison et al. | |
| 6,070,186 A | 5/2000 | Nishio | |
| 6,100,941 A | 8/2000 | Dimitrova et al. | |
| 6,141,010 A | 10/2000 | Hoyle | 345/356 |
| 6,160,570 A | 12/2000 | Sitnik | |
| 6,177,931 B1 * | 1/2001 | Alexander et al. | 725/52 |
| 6,215,483 B1 | 4/2001 | Zigmond | 345/327 |
| 6,230,203 B1 | 5/2001 | Koperda et al. | |
| 6,233,389 B1 | 5/2001 | Barton et al. | 386/46 |
| 6,240,555 B1 | 5/2001 | Shoff et al. | 725/110 |
| 6,252,952 B1 | 6/2001 | Kung et al. | |
| 6,263,505 B1 | 7/2001 | Walker et al. | |
| 6,487,538 B1 | 11/2002 | Gupta et al. | |
| 6,546,556 B1 | 4/2003 | Kataoka et al. | |
| 6,546,566 B1 | 4/2003 | Geisel | |
| 6,588,015 B1 | 7/2003 | Eyer et al. | |
| 6,698,020 B1 * | 2/2004 | Zigmond et al. | 725/34 |
| 6,732,183 B1 | 5/2004 | Graham | |
| 6,937,841 B1 | 8/2005 | Guy et al. | |
| 6,961,954 B1 | 11/2005 | Maybury et al. | |
| 2001/0025377 A1 * | 9/2001 | Hinderks | 725/109 |
| 2001/0050920 A1 | 12/2001 | Hassell et al. | |
| 2002/0026351 A1 * | 2/2002 | Coleman | 705/14 |
| 2002/0083439 A1 | 6/2002 | Eldering | |
| 2002/0124246 A1 | 9/2002 | Kaminsky et al. | |
| 2002/0144262 A1 | 10/2002 | Plotnick et al. | |
| 2002/0194589 A1 | 12/2002 | Cristofalo et al. | |
| 2003/0005463 A1 | 1/2003 | Macrae et al. | |
| 2003/0009592 A1 * | 1/2003 | Stahura | 709/245 |
| 2003/0126597 A1 * | 7/2003 | Darby et al. | 725/32 |
| 2005/0015796 A1 | 1/2005 | Bruckner et al. | |

OTHER PUBLICATIONS

"CLARIA—A Leader in Online Behavioral Marketing" retrieved May 26, 2004 from http://www.claria.com (formerly http://www.gator.com).

Office Action dated Aug. 10, 2005, cited in related U.S. Appl. No. 09/878,139.

Office Action issued Mar. 20, 2006, in related U.S. Appl. No. 09/878,139, filed Jun. 8, 2001.

Office Action mailed Mar. 20, 2006, for U.S. Appl. No. 09/878,139, filed Jun. 8, 2001.

* cited by examiner

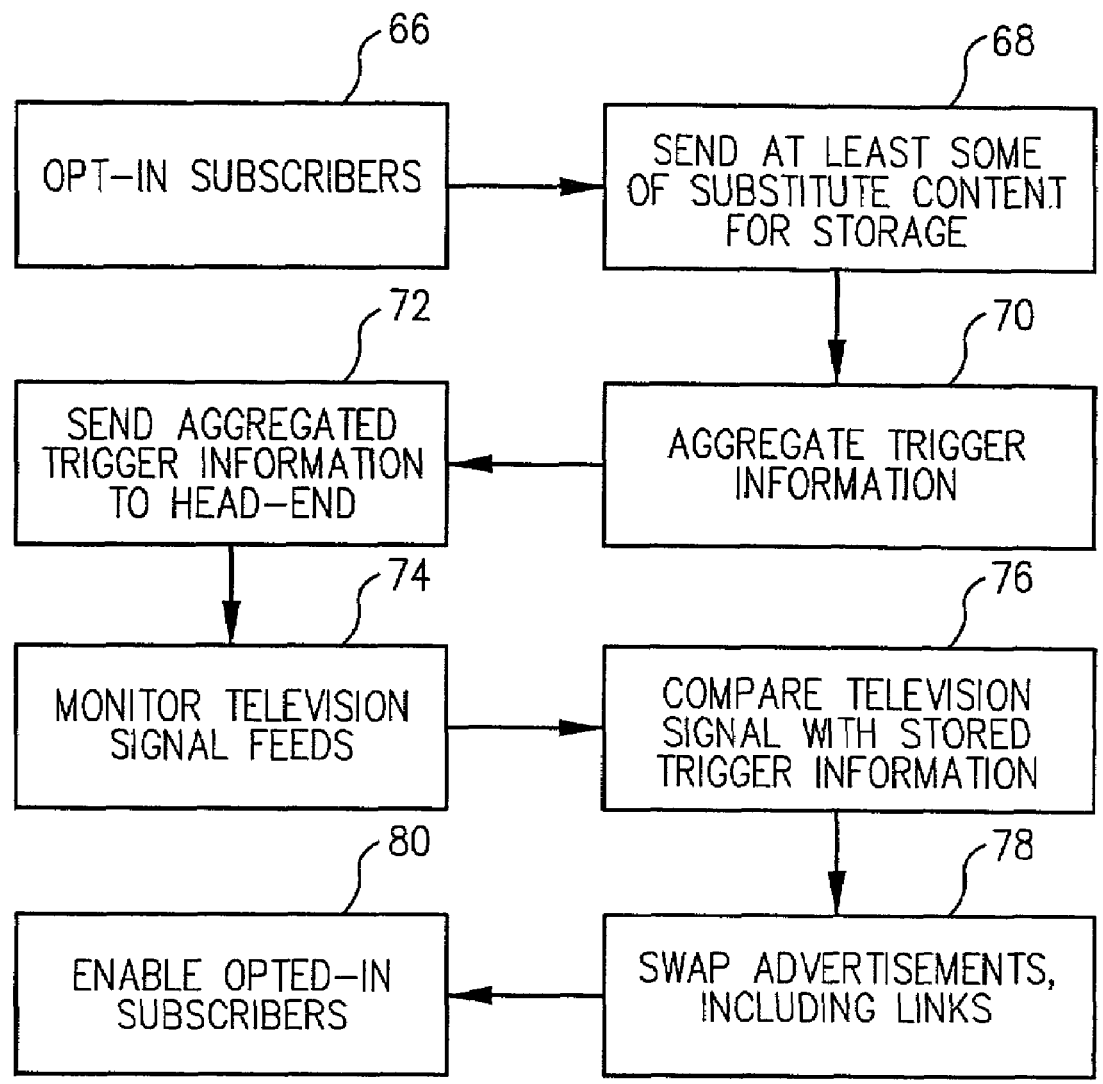

ADVERTISEMENT SWAPPING USING AN AGGREGATOR FOR AN INTERACTIVE TELEVISION SYSTEM

TECHNICAL FIELD

This disclosure relates generally to interactive television systems, and in particular but not exclusively, relates to use of an aggregator in connection with advertisement swapping in an interactive television system.

BACKGROUND

A growing number of television content sources enable interactive television. When operational, interactive television provides useful e-commerce, advertising, and information capabilities to viewers. One mechanism for interactivity typically involves the insertion of information or data in hidden portions of a television video signal. This information can range from a simple web link, such as an Internet uniform resource locator (URL) address, to a fairly complete set of extensible markup language (XML) information that can form a complex web page accompanied by web links (e.g., to advertisers' web pages). Advanced Television Enhancement Forum (ATVEF) triggers or triggering techniques by Wink are examples of mechanisms for providing interactive information along with television signals.

This information (e.g., triggers and accompanying content and data, which will be referred to collectively herein as "trigger information") is typically inserted or carried in a vertical blanking interval (VBI) portion of an analog television video signal. For digital television broadcasts, this trigger information may be inserted into a special data slice of an MPEG-2 bit stream or signal. Modern analog/digital set top boxes or other client terminals can decode these signals to obtain the trigger information, and with the appropriate enabling software, convert the trigger information into a rich interactive experience for the viewer.

Unfortunately, typical television systems leave the interactive experience under the exclusive control of content providers. The cable service provider or multiple system operator (MSO) has limited opportunity to customize or enhance that experience for the viewer. In other words, because the content providers are typically the parties that provide and insert the trigger information into the television signals, the MSO's role is often reduced to simply relaying the television signals to viewers without any modification or customization.

An area where this limitation can cause problems is in television advertising. Because the content providers generally provide the television signals having the embedded triggers (which correspond to advertisements present in the television signal), current techniques for advertisement substitution (or "advertisement swapping") may be difficult to implement, due to the technical differences between interactive television and conventional television and due to many MSOs' limited capability to modify television content provided from content providers. For example, simply swapping a national commercial with a local commercial (so that specific local retail merchant information can be provided to the viewer, for instance) is more easily said than done in an interactive television environment, given factors such as ensuring that URL addresses are consistent and correct, the capabilities of subscribers' terminals to recognize and process interactive content, licensing considerations, and so on.

Accordingly, improvements are needed in techniques for providing advertisements to interactive television viewers.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5 is flowchart illustrating an embodiment of advertisement swapping that can be conducted at a head-end in the system of FIG. 1.

DETAILED DESCRIPTION OF THE ILLUSTRATED EMBODIMENTS

Embodiments of a system and method to use an aggregator in an interactive television system in connection with advertisement swapping are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiments" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention provides an interactive information aggregation presence on the Internet or other location for offbroadcast transmission of advertisement swapping trigger information, which can include interactive television triggers, accompanying content and data, addresses such as URL addresses, and the like. An embodiment of the invention can be implemented as an interactive television system that can perform real-time aggregation of trigger information for advertisement swapping through cooperation with content providers or via reception of trigger information (including interactive content) provided by third-party entities. The aggregated information can be used to perform advertisement swapping, such as by switching to a channel that carries substitute advertisements or by retrieving substitute advertisements (including overlay information) from a storage location. The advertisement swapping can also include replacement of links (such as URL links) that are present in the original advertisement with substitute links.

Figure 1:
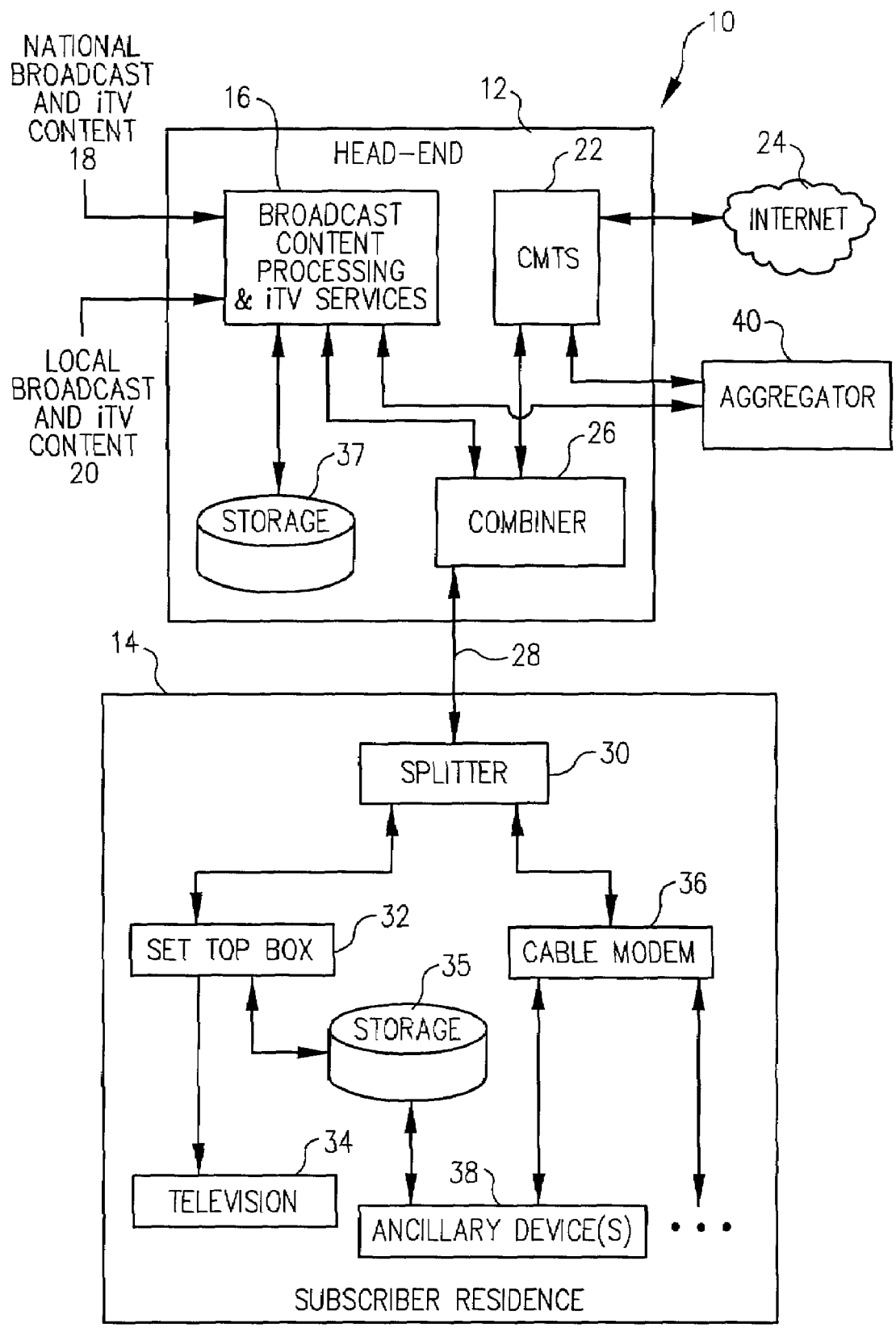
FIG. 1 is a block diagram of a system that can implement an embodiment of the invention.

Referring first to FIG. 1, shown generally at 10 is an interactive television system that can implement an embodiment of the invention. The system 10 includes one or more broadcast centers, such as head-ends 12 for a cable distribution system or broadcast centers for a satellite delivery system (described below), to distribute television broadcast content and interactive television (sometimes referred to as "iTV") content to a plurality of subscriber residences 14. The head-end 12 includes broadcast content processing and iTV services hardware and software (including processors, servers, storage media, databases, and so on), which are shown generally in FIG. 1 as a unit 16. The unit 16 can receive national broadcast content and iTV content 18 from content providers, satellite feeds, servers, or other sources. The unit 16 can also receive local broadcast content and iTV content 20 from parties such as local studios, servers, content providers, or other sources. The content 18 and 20 can include original advertisements (such as commercials) to be broadcast, including interactive content in the advertisements (such as URL addresses or other links).

A cable modem termination system (CMTS) 22 provides the head-end 12 (and ultimately the subscriber residences 14) with access to the Internet 24. A combiner 26 places the signals and/or data provided by the unit 16 and the CMTS into appropriate channels of a communication network 28. In accordance with an embodiment of the invention, the communication network 28 can comprise a hybrid fiber-coaxial cable distribution network comprising channels having a bandwidth of 6 MHz. Some of these channels of the communication network 28 are used to carry television signals (which may be accompanied by interactive content and other trigger information), while other channels are used for upstream and downstream communication of data with the Internet 24. Some other channels (sometimes referred to as "out-of-band" channels) of the communication network 28 may be used to carry electronic program guide (EPG) information. In one embodiment of the invention, at least one of these out-of-band channels may be used to carry advertisement information, such as graphics, information for overlays, media files, and so on, and may be used for carrying trigger information for advertisement swapping as well.

Examples of techniques that can be used to provide interactive content and other trigger information from the unit 16 to set top boxes in the subscriber residences 14, via channels of the communication network 28, include MPEG methods that multiplex special data stream(s) into the digital video transport stream, encoding/embedding data in the VBI portion of the analog television video signals (e.g., ATVEF triggers), using out-of-band modems (e.g., Digital Audio-Visual Council or "DAVIC" modems) to provide the interactive content, and other such techniques that provide information related to the content of the television signals. For the channels of the communication network 28 that are used for communication of data to and from the Internet 24, protocols such as Data Over Cable Service Interface Specifications (DOCSIS), transmission control protocol/Internet protocol (TCP/IP), hypertext transfer protocol (HTTP), file transfer protocol (FTP), or other suitable protocols/techniques may be used.

At the residence 14, a splitter 30 is coupled to receive the television signals (including interactive content and other trigger information) from the communication network 28. The splitter 30 sends the received television signals (including interactive content and other trigger information) to a first client terminal, such as a set top box 32, which subsequently sends the signals and other information to a television 34. As will be understood by those skilled in the art, the set top box 32 includes components such as digital/analog video processing unit(s), VBI decoders, central processing units, memory, video graphics processing unit(s), software, and other components that can detect, extract, and process trigger information and other interactive content that is received from the communication network 28. For instance, these components can extract URL addresses from the trigger information and present the URL addresses as hypertext links or other visual indicator on the television 34, which the viewer can "click" to connect to the Internet 24. These components and the specifics of their operation are not shown in FIG. 1 or described in further detail herein for the sake of simplicity of explanation.

In accordance with one embodiment of the invention, the set top box 32 can include or be coupled to a storage unit 35. The storage unit 35 can comprise a machine-readable storage medium such as a cache, buffer, memory, diskette, compact disk, tape, flash memory, random access memory (RAM) or the like and their associated hardware, in one embodiment. In an embodiment the storage unit 32 can comprise a hard disk such as a digital or personal video recorder (DVR or PVR). Alternatively or in addition, a storage unit 37 may be coupled to or comprise part of the unit 16 at the head-end 12 (or otherwise be communicatively coupled to other components of the head-end 12).

Typically, a viewer of the television 34 can view television programs and experience interactive television via use of a remote control (not shown) that communicates with the set top box 32. Examples of such interactivity with the television 34 and set top box 32 include being presented with or accessing supplementary information that may accompany a television program by "clicking" on an on-screen icon that is displayed via use of triggers, conducting e-commerce by clicking on on-screen menus or icons that are activated by triggers, navigation of the set top box 32 to a URL address on the Internet 24 in response to the viewer's "clicking" of an on-screen icon, and so on.

In some embodiments, the splitter 30 can be coupled to a cable modem 36. With basic embodiments of the splitter 30, the cable modem 36 receives the same input as the set top box 32 (e.g., receives the same television signals). With more complicated embodiments of the splitter 30, the cable modem 36 and the set top box 32 may receive different channels. Whether receiving the same or different channels from the splitter 30, a primary function of the cable modem 36 is to provide one or more ancillary devices 38 with access to the Internet 24. Examples of the ancillary device 38 can include, but not be limited to, PCs, wireless handheld devices, companion set top boxes, two-way advanced remote controls, or other browser-enabled display devices or client terminals that have the capability to communicate with the Internet 24. The ancillary device(s) 38 can include or be coupled to the storage unit 35 (or other storage unit).

Thus, for instance, the cable modem 36 can use the DOCSIS protocol to allow the user of the ancillary device 38 to "surf" the Internet, regardless of whether or not television programming is currently being concurrently displayed on the television 34. Indeed, many subscribers prefer to use cable modems as their method of access to the Internet 24, rather than or in addition to, a telephone modem, a digital subscriber line (DSL), and the like.

In an embodiment of the invention, advertisement swapping may be performed such that the set top box 32 and/or the ancillary device 38 renders for display a substitute advertisement instead of (or in addition to, such as via an overlay) an originally broadcasted advertisement. According to various embodiments, the substitute advertisements may be available on a separate channel of the communication network 28, from the storage unit 35, from a storage unit at the head-end 12, or from some other location. An aggregator 40 can aggregate trigger information, in an embodiment, that can cause the advertisement swapping to occur.

That is, an embodiment of the invention provides the aggregator 40 that can aggregate trigger information to accompany television broadcasts. Such trigger information allows recognition of original broadcast advertisements that are designated for swapping, and then causes the swapping of the original broadcast advertisements with substitute advertisements. This trigger information can include triggers, interactive content, URL and other addresses, links, hypertext markup language (HTML) pages, streaming media, files, or other information or combination thereof.

The trigger information for advertisement swapping can be provided by the aggregator 40 to the cable modem 36 in a format that the ancillary devices 38 can process. The aggregated information can be collected/aggregated and at least some provided to the cable modem 36 concurrently (e.g., in "real-time") with the corresponding television program that is provided to the set top box 32 and the television 34. Moreover, at least some of the aggregated information can be provided at other times, such as in response to a request for the information sent from the ancillary device 38 or set top box 32 (which may not necessarily be concurrent with the presentation of the television program on the television 34). The aggregator 40 can also provide this trigger information to the set top box 32, alternatively or in addition to the ancillary devices 38, so that the set top box 32 can be involved in the advertisement swapping.

In accordance with an embodiment of the invention, the aggregator 40 can include a combination of hardware and software (such as one or more processors, one or more servers, databases and other storage media, software and other machine-readable instructions stored on a machine-readable medium, and so on) that delivers its aggregated content via at least one of the channels of the communication network 28, using the DOCSIS protocol as an example, to the ancillary devices 38 connected to the cable modem 36. The aggregator 40 can be located in the head-end 12 in one embodiment, while in other embodiments, the aggregator 40 can be located outside of the head-end 12, including somewhere in the Internet 24. In several example implementations where the aggregator 40 operates to provide URL addresses (or other interactive information peculiar to the Internet 24) to the ancillary devices 38, the aggregator 40 can be communicatively coupled to the CMTS 22 in accordance with an embodiment of the invention, so that the aggregator 40 can provide such information to the ancillary devices 38 via the CMTS 22.

It is to be appreciated that the aggregator 40 need not necessarily be coupled to the CMTS 22 in some embodiments, so long as the aggregator 40 can deliver aggregated information that can be used by the ancillary device 38 and/or the set top box 32 for advertisement swapping. For instance, the aggregator 40 can deliver the aggregated information to the ancillary devices 38 via a non-cable modem connection (such as telephone line, DSL, or other network different from the communication network 28) that the ancillary devices 38 may have with the Internet 24. Alternatively or in addition to being coupled to the CMTS 22, the aggregator 40 can be coupled to or comprise part of the unit 16, as depicted in FIG. 1. In such an embodiment, the aggregator 40 can provide the trigger information to the unit 16 so that advertisement swapping may be performed by the unit 16 by way of channel switching to a channel that carries substitute advertisements.

Various techniques can be used by the aggregator 40 to aggregate trigger information and to eventually provide this trigger information to the ancillary devices 38, set top box 32, and/or the unit 16 for purposes of advertisement swapping. Examples of these techniques are illustrated in the subsequent figures, and generally include receiving the trigger information from third-party entities, direct network links from the unit 16 to the aggregator 40, or direct feeds from content providers to the aggregator 40.

Figure 2:
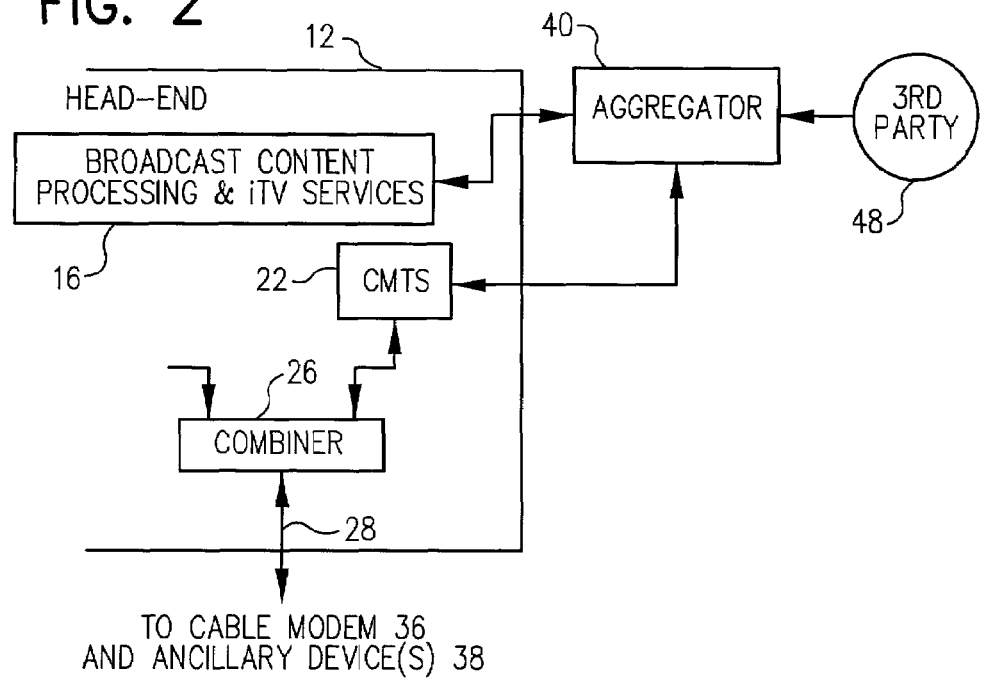
FIG. 2 is a block diagram illustrating an example of an aggregation technique for advertisement swapping for the system of FIG. 1 in accordance with an embodiment of the invention.

FIG. 2 is a block diagram illustrating an example of an information aggregation technique for the system 10 of FIG. 1 in accordance with one embodiment of the invention. In the embodiment of FIG. 2, a third-party entity 48 provides advertisement swapping trigger information to the aggregator 40. An example of the third-party entity 48 can include a service that is licensed to generate triggers and to provide these triggers to an MSO or other operator of the head-end 12. For instance, the third-party entity 48 may be contracted with the MSO and with Company A to generate trigger information to swap Company A's advertisements in place of Company B's advertisements in the television signals broadcasted from the head-end 12 (e.g., a "Swap Company A into Company B" trigger). The third-party entity 48 may also provide other types of interactive content to the aggregator 40, including trigger information in the form of URL and other addresses, links, HTML pages, streaming media, and so on.

When the aggregator 40 has received the information from the third-party entity 48, the information can be stored or aggregated in storage media in the aggregator 40. This aggregation at the aggregator 40 can involve activities such as recording characteristics related to the trigger information, such as the type of information received, the advertisement to be swapped and channel, dates and times of transmission, the expiration date(s) of the trigger information, and other such data that correlate the substitute advertisement with the original advertisement. Afterwards, the aggregated information can be broadcasted, IP multicasted, or unicasted from the aggregator 40 to one or more client terminals in one or more subscriber residences 14. In accordance with an embodiment of the invention, the aggregated trigger information can be sent to the ancillary device 38 by way of the CMTS 22, through a channel of the communication network 28 that uses the DOCSIS protocol, and then to the cable modem 36. Alternatively or in addition, an out-of-band channel may be used to send the aggregated trigger information from the aggregator 40.

In accordance with an embodiment of the invention where the advertisement swapping occurs at the subscriber residence 14 (rather than at the head-end 12), the aggregated information can be transmitted (e.g., broadcast, multicast, or unicast) to the ancillary device 38 (or to the set top box 32) from the aggregator 40 in real-time and concurrently with original advertisements that are sent via television signals from the head-end 12. The information provided by the third-party entity 48 to the aggregator 40 can be pre-formatted or pre-configured by the third-party entity 48 in a manner that is recognizable to the ancillary devices 38 in one embodiment.

Alternatively or in addition, the aggregated trigger information can be sent for storage in the storage unit 35 (or other local storage unit) at times that are different from the broadcast times of the original advertisements. Then, incoming television signals from the head-end 12 are monitored and compared with the stored trigger information to determine if advertisements in the television signals are appropriate for swapping. This process will be described later below.

Figure 3:
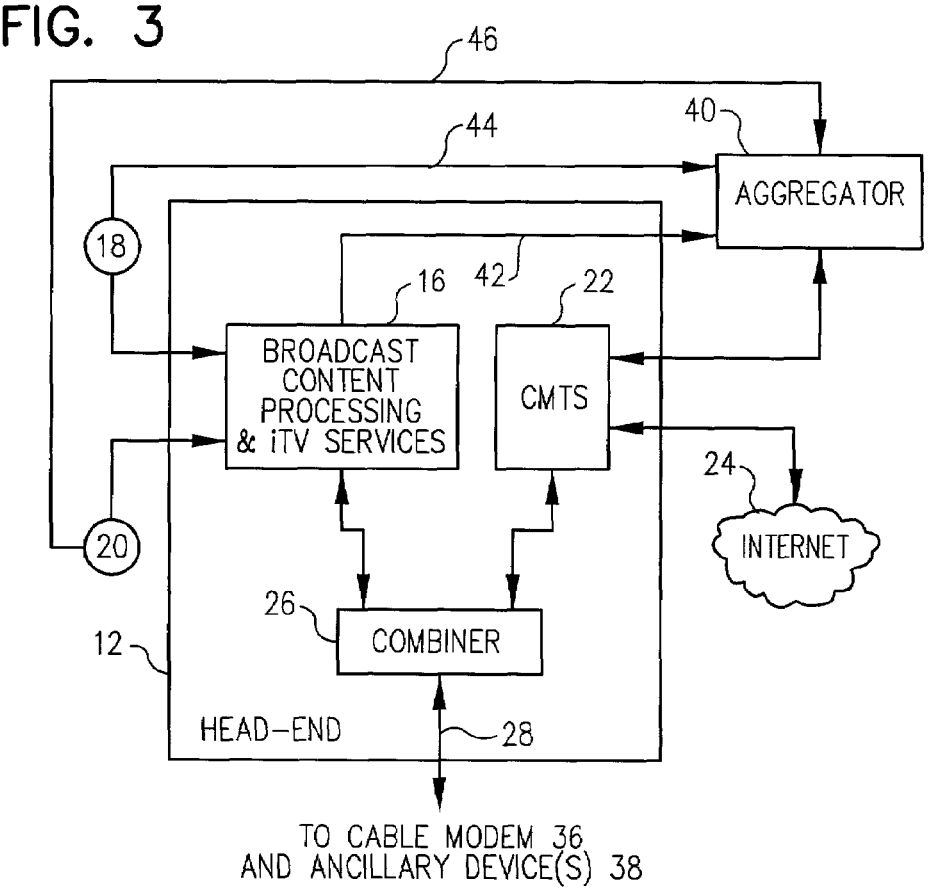
FIG. 3 is a block diagram illustrating examples of aggregation techniques for advertisement swapping for the system of FIG. 1 in accordance with another embodiment of the invention.

FIG. 3 is a block diagram illustrating additional examples of information aggregation techniques for the system 10 of FIG. 1 in accordance with an embodiment of the invention. More specifically, FIG. 3 illustrates direct network link(s) 42 from the unit 16 to the aggregator 40, and direct feeds 44 and 46 from content providers (e.g., providers of national broadcast content and iTV content 18 and providers of local broadcast content and iTV content 20, respectively) to the aggregator 40.

With regards to the link 42, the unit 16 can provide trigger information and other related content directly to the aggregator 40. Because the unit 16 is coupled to receive television signals and information for eventual transmission via the channels of the communication network 28, the unit 16 can obtain trigger information from all incoming television signals where such interactive data is present and is capable of being used for advertisement swapping. Such an embodiment of the link 42 can be implemented, for instance, in situations where the hardware and software of the unit 16 has extracted or otherwise obtained substitute trigger information from content providers and/or television signals. Then, this substitute trigger information can be provided directly to the aggregator 40 after the unit 16 has processed the information or otherwise configured the information to a format that is suitable for the ancillary devices 38 or for the set top box 32.

With regards to the direct feeds 44 and 46 of FIG. 3, the content providers can provide substitute trigger information directly to the aggregator 40. In an embodiment, the information provided via the direct feeds 44 and 46 to the aggregator 40 can be pre-formatted or pre-configured by the content providers in a manner that is recognizable to the ancillary devices 38 or to the set top box 32. Illustrative examples of the information that can be provided to the aggregator 40 via the direct feeds 44 and 46 include the substitute advertisement itself, triggers used by the ancillary device 38 and/or the set top box 32 to determine if an original advertisement is to be substituted, URL addresses indicative of locations of substitute interactive content, interactive content that is to accompany the substitute advertisements, and the like.

Once the information is received via the direct feeds 44 and 46, the aggregator 40 can aggregate and deliver the information to the ancillary devices 38 and the set top box 32 via the techniques described above for the embodiment of FIG. 2. It is to be appreciated that in one embodiment, both the direct link 42 and the direct feeds 44 and 46 may be used to provide advertisement swapping trigger information and other substitute interactive content to the aggregator 40.

Figure 4:
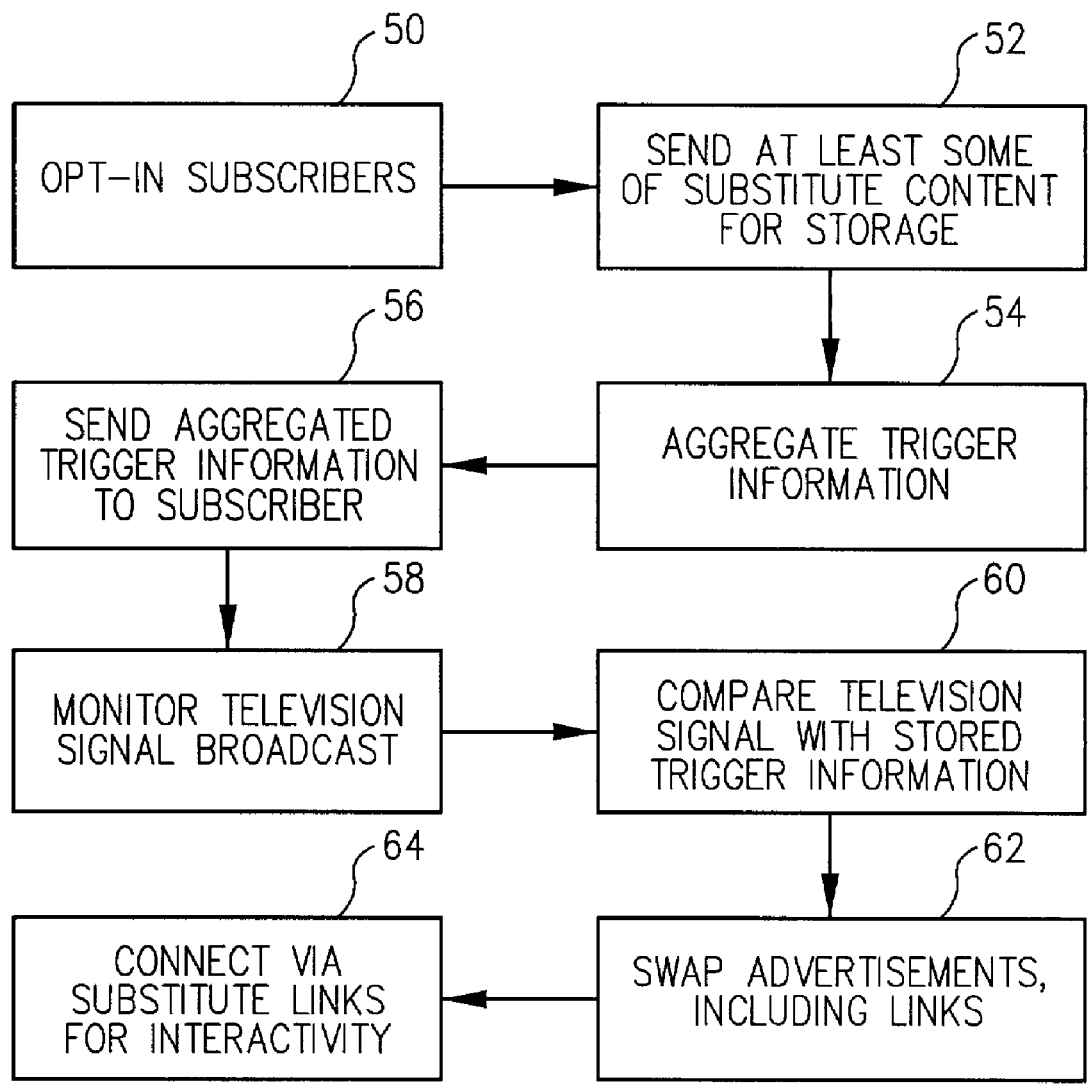
FIG. 4 is flowchart illustrating an embodiment of advertisement swapping that can be conducted at a subscriber residence in the system of FIG. 1.

The embodiments shown in FIGS. 2-3 have been generally described above in the context of providing trigger information to the ancillary devices 38 and/or to the set top box 32 such that these devices can be the primary devices for performing advertisement swapping. It is to be appreciated that the trigger information for advertisement swapping may also be provided by the aggregator 40 to the unit 16 of the head-end 12, so that the unit 16 may be the primary component for initiating advertisement swapping. FIGS. 4 and 5 are flowcharts illustrating advertisement swapping that can be performed at the subscriber residence 14 and/or at the head-end 12, respectively, according to embodiments of the invention. Elements of these flowcharts may be embodied in software or other machine-readable instructions stored on a machine-readable medium, such as the storage unit 35 or storage unit at the head-end 12 or aggregator 40.

The flowchart of FIG. 4 illustrates an embodiment of advertisement swapping that may be performed by device(s) at the subscriber residence 14 (such as by the set top box 32, ancillary devices 38, storage unit 35), in cooperation with the aggregator 40 and the head-end 12. Beginning first at a block 50, subscribers are opted-in by the cable service provider or MSO. Stated in another way, subscribers who wish to receive substituted advertisement services can specifically request that service. One technique for recording opted-in subscribers is to store set top box identification codes or other subscriber identification data in a database. When advertisement swapping is to occur, a lookup of this database can be performed to determine which subscribers are to receive substitute advertisements, advertisement swapping trigger information, and so on.

It is to be appreciated that in other embodiments, an MSO or other party may perform advertisement swapping on a subset of the subscribers without the subscribers' knowledge. Such situations may occur, for example, in order to provide targeted advertising. Therefore, in this case, advertisement swapping occurs without a subscriber necessarily having "opted-in."

Next at a block 52, at least some of the substitute advertisement content is sent to the subscriber residence for storage, such as in the storage unit 35. Examples of such substitute advertisement content can include, but not be limited to, substitute advertisements (such as audio and video clips), URL addresses or other addresses associated with locations of interactive content, graphics and other information for overlays, media files, and the like. This content can be sent to the storage unit 35 via a DOCSIS channel, out-of-band channel, other channel of the communication network 28, or via a network different from the communication network 28, such as a DSL line. The content can also be updated as needed via use of expiration codes or by sending new content to replace old content.

At a block 54, the aggregator 40 aggregates trigger information, such as via the techniques shown in FIGS. 2-3. This trigger information can include real-time triggers provided by the third-party entity 48 to swap a received broadcast advertisement with a substitute advertisement stored in the storage unit 35 at the block 52. At a block 56, the aggregated trigger information is sent by the aggregator 40 to the subscriber residence 14 (e.g., to the ancillary devices 38 via DOCSIS and the cable modem 36 and/or to the set top box 32). If real-time aggregated trigger information is being sent from the aggregator 40, then the set top box 32 and/or the ancillary devices 38 can receive the aggregated trigger information for advertisement swapping concurrently with the advertisements that are to be swapped. Moreover, it is to be appreciated that what is shown in the blocks 52-56 of FIG. 4 can be combined operations in some embodiments of the invention.

Next at a block 58, software or other application of the set top box 32 or the ancillary device 38 monitors the television signal broadcasts received from the head-end 12. Specifically, the television broadcast is monitored for triggers that identify the advertisements to be replaced, and for triggers in the broadcast that demarcate the beginning and end of the broadcast advertisements, if such demarcating triggers are present. The monitored trigger information in the television signal is compared with the stored trigger information at a block 60.

If an advertisement to be swapped is identified (such as if the trigger information in the television signal matches the stored trigger information received from the aggregator 40), then advertisement swapping is performed at a block 62. In embodiments where the trigger information is received in real-time from the aggregator 40 (e.g., concurrently with the corresponding advertisements in the broadcast television signal), advertisement swapping can be performed automatically without having to perform the comparison at the block 60. For instance, if it is determined that the set top box 32 is tuned to a particular channel at a particular time that real-time substitute trigger information is received from the aggregator 40, then advertisement swapping can be performed on the corresponding advertisement that is currently being broadcasted.

Several techniques can be performed to provide advertisement swapping at the block 62. One technique is to switch the input to the television 34 (or the input to a display of the ancillary device 38), such that the input is in the form of a substitute advertisement from the storage unit 35 rather than the original broadcast advertisement. After the substitute advertisement has finished playing, the input to the television 34 can be switched back to the original broadcast.

Another technique is to switch a tuner of the set top box 32 or the ancillary device 38 to a specific channel of the communication network 28 where substitute advertisements are carried. This channel switching may be performed by software in one embodiment, in response to identification of advertisements that are to be swapped (or identification of their triggers). Alternatively or in addition to channel switching, data or graphics stored in the storage unit 35 may be retrieved and then overlaid over the broadcast advertisement after the broadcast advertisement is identified as one that is to be replaced. Picture-in-picture arrangements can also be used to provide this overlay. The overlay information can include local advertisements, substitute URL addresses, screen prompts, and so on.

In yet another embodiment, such content can be delivered over the communication network 28 or other network (e.g., via streaming audio or video clips from an Internet site or a dedicated headend server). The set top box 32 receives and decodes the content/information, and then swaps or overlays it with the live broadcast.

In accordance with an embodiment of the invention, the advertisement swapping at the block 62 can include swapping of links. For instance, if there are URL links in the triggers of the original advertisements that need to be replaced, the substitute advertisements can provide substitute URL links in their triggers. When the substitute advertisements are displayed to the viewer along with the substitute links, the viewer can click on the substitute links to receive substitute interactive content (e.g., can link to a web site of the substitute advertiser). In this manner, the viewer is never presented with and never sees the original links. Upon clicking the substitute link, the viewer can experience interactivity at a block 64.

In another embodiment, the viewer can be presented with and can click on an original link. Then, the swapping of links can be performed by an application of the set top box 32 or ancillary device 38 by way of redirection to an address corresponding to a substitute link. For the viewer, this redirection can be performed transparently. Thereafter, substitute interactive content/advertising/experience can be provided to the viewer at the block 64, via a DOCSIS connection (for example) to the Internet 24 by way of the CMTS 22.

In yet another embodiment, the original links themselves can be replaced prior to being provided to the television 34 or to a display of the ancillary device 38. For instance, if the audio and video segment of the original advertisement is to be maintained, but the original links are to be replaced with substitute links, hardware and software of the set top box 32 or ancillary devices 38 can perform processing to extract the original links from the television signal. Then, these extracted links can be discarded and substitute links can be provided in their place for display on the television 34.

The flowchart of FIG. 5 illustrates an embodiment of advertisement swapping that may be performed by the unit 16 of the head-end 12 or at some other broadcast center, in cooperation with the aggregator 40. Beginning at a block 66, subscribers can be opted-in for the advertisement substitution service, such that only opted-in subscribers receive substitute advertisements in one embodiment. In another embodiment, the opting-in at the block 66 need not be performed, resulting in all subscribers receiving the substitute advertisements. Next at a block 68 (similar to the block 52 of FIG. 4), at least some of the substitute content (such as substitute advertisements) is sent to a storage unit of the head-end 12 for storage, such as to the storage unit 37. Also similar to the blocks 54 and 56 of FIG. 4, trigger information is aggregated by the aggregator 40 at a block 70 but is instead sent to the head-end 12 for storage at the block 72.

Next at a block 74, the unit 16 monitors the incoming television signal feeds from the sources 18 and 20, and compares the trigger information in these television signals with the stored trigger information at a block 76. If there is a match (e.g., triggers of advertisements to be swapped match the triggers of the substitute advertisements, as determined by a database lookup in the storage unit 37, for instance), then advertisement swapping occurs at a block 78. As before, several techniques can be used to perform advertisement swapping at the block 78.

One technique is to extract (from the television signal) the original triggers corresponding to the original advertisements, and then replace the original triggers in the television signal with substitute triggers (having substitute URL links for instance). Various trigger extraction and insertion hardware, software, and techniques may be used to perform this operation.

Another technique uses the unit 16 to perform channel switching upon identification of an advertisement to be swapped. For example, the unit 16 can use a lookup table to identify the substitute advertisement to swap in place of a broadcast advertisement, and then switch an output feed from the head-end 12 such that the substitute advertisement is broadcast instead of the original advertisement. This output feed from the head-end 12, in one embodiment, can be by way of a channel that carries the substitute advertisement, which itself may be sourced from the storage unit 37 in the head-end 12 that stores the substitute commercial (as referenced at the block 68). In another embodiment, this output feed from the head-end 12 can be an override of the original advertisement with the stored substitute advertisement, on the original channel.

As with the block 62 of FIG. 4, links in the original advertisements can be replaced at the block 78. One technique is to completely replace the original links with new links, which can be done inherently when replacing the original advertisements with the substitute advertisements or when selectively replacing original triggers/links in the television signal with substitute triggers/links while maintaining the original audio and video portion of the original advertisement. Other techniques include the insertion of substitute triggers that have redirection commands. These triggers can be inserted in the original television signal as completely new triggers, or existing triggers may be modified to have this redirection command added.

As mentioned above, the substitute advertisement may be broadcast to all subscribers or to just opted-in subscribers. To selectively send to opted-in subscribers, the client terminals (e.g., set top boxes 32) of opted-in subscribers may be enabled at a block 80. For instance, a look-up technique can be used to determine opted-in subscribers, and then, a code can be sent from the head-end 12, via DOCSIS or an out-of-band channel, to instruct the set top box 32 of opted-in subscribers to tune to the channel where the substitute advertisements are carried. The set top boxes of non-opted-in subscribers either do not receive this code, or would be unable to process it.

In conclusion, the aggregator 40 is provided in connection with advertisement swapping. The aggregator 40 can be implemented in the interactive television system 10 so as to perform real-time aggregation of trigger information for advertisement swapping through cooperation with content providers or third-party entities 48, or a combination of these resources. The aggregated information can then be made available to set top boxes 32 and/or ancillary devices 38. Advertisement swapping may be performed via channel switching to a channel that broadcasts substitute advertisements or by retrieving substitute advertisements from the storage unit. The advertisement swapping may be performed by devices of opted-in subscribers, or by devices at the head-end 12. The advertisement swapping can also include replacement of original links in the advertisements with substitute links, so that the viewer can experience interactivity and/or receive interactive content associated with the substitute links. The substitute advertisements may be swapped during a time period of the original broadcast/advertisement that substantially correspond to beginning and end locations of the advertisement that may be demarcated by the original triggers. In this manner, the substitute advertisement may be inserted without any noticeable clipping, "blips," or blank images that may otherwise occur if the substitution occurred at improper segments of the broadcast.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, while the various figures and accompanying description illustrate set top boxes and ancillary devices 38 as being present and used in subscriber residences, it is to be appreciated that such devices can be used in other locations where interactive television reception is available, such as offices, libraries, schools, airports, and so on. Therefore, the invention is not limited by the specific location of any one of the ancillary devices 38 and/or set top boxes. Furthermore, while the various figures illustrate only a single set top box and ancillary device in each subscriber residence, it is to be appreciated that there may be multiple numbers of these devices in any one location.

Additionally, while the terms "aggregation" or "aggregator" is used throughout this description and in the claims, these terms are not intended to necessarily require a timing element or time constraint. That is, in some embodiments, "aggregation" or "aggregator" can include situations where trigger information is collected by the aggregator 40 and then delivered to the ancillary devices 38 or set top box 32 without any substantive time delay caused by storage prior to delivery. In effect, the trigger information is delivered to the ancillary devices 38 in what appears to be real time to the viewer. In other embodiments, "aggregation" or "aggregator" can include situations where the trigger information is actually collected and stored for later delivery, such as in response to the viewer's browser request for the trigger information, and hence a timing element can be involved.

Moreover, alternatively or in addition to a cable distribution system, a satellite television (TV) delivery system may be implemented. A satellite TV delivery system may comprise a direct broadcast satellite (DBS) system. A DBS system may comprise a small 18-inch satellite dish (which is an antenna for receiving a satellite broadcast signal); a digital integrated receiver/decoder (IRD), which separates each channel, and decompresses and translates the digital signal so a television can show it; and a remote control. Programming for a DBS system may be distributed, for example, by multiple high-power satellites in geosynchronous orbit, each with multiple transponders. Compression (e.g., MPEG) is used to increase the amount of programming that can be transmitted in the available bandwidth.

A digital broadcast center may be used to gather programming content, ensure its digital quality, and transmit the signal up to the satellites. Programming may come to the broadcast center from content providers (TBS, HBO, CNN, ESPN, etc.) via satellite, fiber optic cable and/or special digital tape. Satellite-delivered programming is typically immediately digitized, encrypted and uplinked to the orbiting satellites. The satellites retransmit the signal back down to every earth-station—or, in other words, every compatible DBS system receiver dish at customers' homes and businesses. In one embodiment, therefore, the communication network 28 comprises this satellite communication link to the subscriber residences 14.

Some programs may be recorded on digital videotape in the broadcast center to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:

sending one or more television signals to a client terminal via a first channel of a communication network, wherein prior to being sent to the client terminal, the television signal includes information related to a first advertisement present in the television signal;

aggregating information related to a second advertisement;

sending at least some of the aggregated information related to the second advertisement to the client terminal via a second channel of the communication network;

correlating the information related to the first advertisement with the information related to the second advertisement;

swapping the first advertisement with the second advertisement if a subscriber has specifically requested to receive substitute advertisement services and if there is a match in the correlated information; and replacing operative link information associated with the first advertisement with link information associated with the second advertisement by presenting the link information associated with the first advertisement to the subscriber and redirecting the subscriber according to the link information associated with the second advertisement.

2. The method of claim 1 wherein the information associated with the first advertisement is sent to the client terminal along with the television signal, and wherein swapping the first advertisement with the second advertisement if there is a match in the correlated information comprises:

storing at least some of the second advertisement in a storage location communicatively coupled to the client terminal;

retrieving the second advertisement from the storage location; and displaying the retrieved second advertisement instead of the first advertisement.

3. The method of claim 2 wherein displaying the second advertisement instead of the first advertisement includes overlaying at least some of the second advertisement over the first advertisement.

4. The method of claim 1 wherein the information associated with the first advertisement is sent to the client terminal along with the television signal, and wherein swapping the first advertisement with the second advertisement if there is a match in the correlated information comprises tuning the client terminal from the first channel to another channel where the second advertisement is carried.

5. The method of claim 1 wherein aggregating the information related to the second advertisement includes receiving at least a portion of the information from a unit that processes the television signals.

6. The method of claim 1 wherein aggregating the information related to the second advertisement includes receiving trigger information from a third-party entity.

7. The method of claim 1, further comprising opting in the client terminal to participate in the swapping of the first advertisement with the second advertisement by storing subscriber identification data for subscribers who specifically requested to receive substitute advertisement services.

8. The method of claim 1 wherein the swapping of the first advertisement with the second advertisement occurs at a broadcast center.

9. The method of claim 8 wherein the swapping of the first advertisement with the second advertisement at the broadcast center includes switching an output feed of the broadcast center to carry the second advertisement instead of the first advertisement.

10. The method of claim 9 wherein switching the output feed includes switching from the first channel to another channel that carries the second advertisement.

11. The method of claim 9 wherein switching the output feed includes overriding the first advertisement with the second advettisement on the television signal carried on the first channel.

12. The method of claim 1, further comprising sending a command to opt-in the client terminal when the subscriber is identified in a database of subscribers who opted-in for the substitute advertisement services.

13. An article of manufacture, comprising:
a machine-readable medium having instructions stored thereon to:

in regards to one or more television signals sent to a client terminal via a first channel of a communication network, wherein prior to being sent to the client terminal, the television signal includes information related to a first advertisement present in the television signal, aggregate information related to a second advertisement that is to replace the first advertisement;

send at least some of the aggregated information related to the second advertisement to the client terminal via a second channel of the communication network;

correlate the information related to the first advertisement with the information related to the second advertisement;

swap the first advertisement with the second advertisement if a subscriber has specifically requested to receive substitute advertisement services and if there is a match in the correlated information; and replace operative link information associated with the first advertisement with link information associated with the second advertisement by presenting the link information associated with the first advertisement to the subscriber and redirecting the subscriber according to the link information associated with the second advertisement.

14. The article of manufacture of claim 13 wherein the instructions to swap the first advertisement with the second advertisement include instructions to tune to a channel where the second advertisement is carried.

15. The article of manufacture of claim 13 wherein the instructions to swap the first advertisement with the second advertisement include instructions to retrieve the second advertisement from a storage location.

16. An apparatus, comprising:
an aggregator communicatively coupled to a broadcast center of an interactive television system, the aggregator capable of aggregating at least some information related to a substitute advertisement, the aggregator further capable of sending at least some of the aggregated information to cause a swap of the substitute advertisement in place of an original advertisement that is provided to the broadcast center if a subscriber has opted-in by specific request to receive substitute advertisement services, wherein the swap with the substitute advertisement via use of the aggregated information includes redirection of a subscriber who clicks on a link that was present in the original advertisement using a link related to the substitute advertisement.

17. The apparatus of claim 16 wherein the aggregator sends the information to a unit of the broadcast center to allow the swap to occur prior to transmission to a client terminal.

18. The apparatus of claim 16 wherein the aggregator sends the information to an opted-in client terminal to allow the swap to occur at the client terminal.

19. An interactive television system, comprising:
a broadcast center to send a television signal to a client terminal via a first channel of a communication network coupled to the broadcast center, wherein prior to being sent to the client terminal, the television signal includes information related to a first advertisement present in the television signal; and an aggregator communicatively coupled to a broadcast center of an interactive television system, the aggregator capable of aggregating at least some information related to a second advertisement, the aggregator further capable of sending at least some of the aggregated information to cause a swap of the second advertisement in place of the first advertisement if a subscriber has opted-in by specific request to receive substitute advertisement services, wherein the swap of the second advertisement includes redirection of a subscriber who clicks on an operative link that was present in the first advertisement using a link related to the second advertisement.

20. The system of claim 19 wherein the information aggregated by the aggregator includes trigger information provided by a third-party entity.

21. The system of claim 19, further comprising a unit disposed at the broadcast center to switch an output feed of the broadcast center from the first channel to a second channel that carries the substitute advertisement.

22. The system of claim 19, further comprising a unit disposed at the broadcast center to override the first advertisement with the second advertisement for the television signal carried on the first channel.

23. The system of claim 19 wherein the broadcast center is capable of sending a command to a client terminal to opt-in the client terminal when the subscriber is identified in a database of subscribers who have opted-in to receive substitute advertisement services.

24. A method, comprising:

sending one or more television signals to a client terminal via a first channel of a communication network, wherein prior to being sent to the client terminal, the television signal includes information related to a first advertisement present in the television signal, wherein the information associated with the first advertisement is sent to the client terminal along with the television signal;

aggregating information related to a second advertisement;

sending at least some of the aggregated information related to the second advertisement to the client terminal via a second channel of the communication network;

correlating the information related to the first advertisement with the information related to the second advertisement; and swapping the first advertisement with the second advertisement if a subscriber has affirmatively elected to receive substitute advertisement services and if there is a match in the correlated information, including presenting link information associated with the first advertisement to the subscriber and upon subscriber activation of the link information, redirecting the subscriber according to link information associated with the second advertisement.

25. The method of claim 24 wherein swapping the first advertisement with the second advertisement if there is a match in the correlated information further includes tuning the client terminal from the first channel to another channel where the second advertisement is carried.

26. An interactive television system, comprising:

a broadcast center to send a television signal to a client terminal via a first channel of a communication network coupled to the broadcast center, wherein prior to being sent to the client terminal, the television signal includes information related to a first advertisement present in the television signal;

an aggregator communicatively coupled to a broadcast center of an interactive television system, the aggregator capable of aggregating at least some information related to a second advertisement, the aggregator further capable of sending at least some of the aggregated information to cause a swap of the second advertisement in place of first advertisement, wherein the swap of the second advertisement includes a presentation of operative link information associated with the first advertisement to the subscriber and upon subscriber activation of the link information, redirection of the subscriber according to link information associated with the second advertisement; and a unit disposed at the broadcast center to receive the aggregated information from the aggregator and, based on the received aggregated information, to switch an output feed of the broadcast center to provide the second advertisement to a client terminal.

27. The system of claim 26 wherein the unit is capable of switching the output feed of the broadcast center via a switch to a channel that carries the substitute advertisement, the unit further capable of sending a command to the client terminal to tune to the channel that carries the substitute advertisement.

28. The system of claim 26 wherein the unit is capable of switching the output feed of the broadcast center via an override of the first advertisement in the television signal with the second advertisement and to send the second advertisement with the television signal on the first channel.

29. A method, comprising:

sending one or more television signals to a client terminal via a first channel of a communication network having a plurality of different channels, wherein prior to being sent to the client terminal, the television signal includes information related to a first advertisement present in the television signal, the information capable of identifying the first advertisement and of demarcating the beginning and ending locations of the first advertisement in the television signal;

aggregating information related to a second advertisement, the aggregated information including information indicative of one or more first advertisements for which the second advertisement is to be swapped;

correlating the information related to the first advertisement with the information related to the second advertisement to determine if the first advertisement is to be swapped with the second advertisement; and swapping the first advertisement with the second advertisement if a subscriber has individually opted in to receive substitute advertisement services and if the correlated information determines that a swap is appropriate, including replacing link information associated with the first advertisement with link information associated with the second advertisement by redirecting the subscriber according to the link information associated with the second advertisement, wherein the second advertisement is swapped for the first advertisement during a time period substantially corresponding to the beginning and ending locations of the first advertisement.

30. The method of claim 29 wherein replacing the link information associated with the first advertisement with the link information associated with the second advertisement including presenting the link information associated with the first advertisement to the subscriber and upon subscriber activation thereof, redirecting the subscriber according to the link information associated with the second advertisement.

31. The method of claim 29 wherein replacing the link information associated with the first advertisement with the link information associated to the second advertisement includes redirecting the subscriber to an address associated with the second advertisement.

* * * * *